United States Patent
Nair et al.

(10) Patent No.: US 8,158,714 B2
(45) Date of Patent: Apr. 17, 2012

(54) SCRUB AND STAIN-RESISTANT COATING COMPOSITIONS, METHOD FOR MANUFACTURING THEREOF AND ARTICLES COMPRISING THE SAME

(75) Inventors: Ritesh Ravi Nair, Irvine, CA (US); Tek Wayne Woo, Chandler, AZ (US); Catherine A. Finegan, Warrington, PA (US); Ozzie M. Pressley, Cheltenham, PA (US); John William Hook, III, Warminster, PA (US); Wei Zhang, Maple Glen, PA (US); I-Hwa Midey Chang-Mateu, Ambler, PA (US)

(73) Assignees: Rohm and Haas Company, Philadelphia, PA (US); Masco Corporation, Taylor, MI (US)

( * ) Notice: Subject to any disclaimer, the term of this patent is extended or adjusted under 35 U.S.C. 154(b) by 545 days.

(21) Appl. No.: 12/342,874

(22) Filed: Dec. 23, 2008

(65) Prior Publication Data

US 2009/0326135 A1    Dec. 31, 2009

Related U.S. Application Data

(60) Provisional application No. 61/009,797, filed on Jan. 2, 2008.

(51) Int. Cl.
*C08L 31/02* (2006.01)
(52) U.S. Cl. ......... 524/556; 524/497; 524/560; 524/547
(58) Field of Classification Search ............ 524/497, 524/556, 560, 547
See application file for complete search history.

(56) References Cited

U.S. PATENT DOCUMENTS

| | | | |
|---|---|---|---|
| 4,243,430 A | | 1/1981 | Sperry et al. |
| 4,539,363 A | | 9/1985 | Backhouse |
| 4,606,648 A | * | 8/1986 | Coyle et al. ............... 366/300 |
| 5,312,863 A | | 5/1994 | Van Rheenen et al. |
| 5,385,960 A | | 1/1995 | Emmons et al. |
| 5,663,224 A | | 9/1997 | Emmons et al. |
| 6,080,802 A | | 6/2000 | Emmons et al. |
| 6,214,467 B1 | | 4/2001 | Edwards et al. |
| 6,492,451 B1 | | 12/2002 | Dersch et al. |
| 6,576,051 B2 | | 6/2003 | Bardman et al. |
| 6,756,459 B2 | | 6/2004 | Larson et al. |
| 2004/0254287 A1 | | 12/2004 | Carey et al. |
| 2006/0030656 A1 | | 2/2006 | Tarng et al. |
| 2006/0229405 A1 | | 10/2006 | Westerman |
| 2007/0021536 A1 | | 1/2007 | Pressley et al. |
| 2007/0200262 A1 | | 8/2007 | Hills |
| 2007/0208129 A1 | * | 9/2007 | Finegan et al. ............... 524/497 |
| 2007/0238827 A1 | | 10/2007 | Brady et al. |

OTHER PUBLICATIONS

International Search Report dated Feb. 19, 2009 for App # PCT/US07/86289, All references cited in PCT listed above.
Supplemental European Search Report issued in EP 08 87 0112, dated Oct. 11, 2011.

* cited by examiner

*Primary Examiner* — Ling Choi
(74) *Attorney, Agent, or Firm* — Cantor Colburn LLP (57) ABSTRACT

Disclosed herein is a method that includes mixing opacifying agent particles with a thickening agent to form a first mixture; the mixing being conducted at a shear rate of about 10 to about 2,000 sec$^{-1}$; the first mixture having a viscosity of greater than or equal to about 70 Krebs units; and mixing a polymer latex binder with the first mixture to form a coating composition; the polymer latex binder including a copolymer that comprises phosphorus containing repeat units and an acrylate polymer.

33 Claims, 2 Drawing Sheets

SCRUB AND STAIN-RESISTANT COATING COMPOSITIONS, METHOD FOR MANUFACTURING THEREOF AND ARTICLES COMPRISING THE SAME

CROSS-REFERENCE TO RELATED APPLICATIONS

This application claims priority to provisional application 61/009,797 filed on Jan. 2, 2008, the entire contents of which are hereby incorporated by reference.

BACKGROUND

This disclosure relates to methods for making scrub and stain-resistant coating compositions and articles comprising the same.

Opacifying agent particles are useful for conferring opacity to plastic articles and films, and particularly to coating compositions. In coating compositions, the opacifying agent particles can be one of the most expensive components. It is an ongoing objective of the coatings industry to achieve the desired degree of opacity while minimizing the amount of opacifying agent particles in the coating composition. The optimal way to make efficient use of opacifying agent particles is to disperse them as well as possible. If not adequately dispersed, opacifying agent particles agglomerate into larger particles, which tend to settle out of the coating composition as "grit". When grit is present, the opacifying agent particles make less than their full potential contribution to the coating opacity and depth of color. In addition, even low levels of grit can significantly detract from the appearance of the coated article. In cases of severe grit, the dried coating film will display a very rough surface texture with an almost sand paper-like appearance.

The hiding power of the coating composition is a function of the spacing of the opacifying agent particles in the dried coating. Maximum light scattering occurs when the opacifying agent particles are spaced far apart from each other, on the order of a few particle diameters, so that there is minimal interference between the light scattered from neighboring particles. In a coating, the distribution of the opacifying agent particles best approaches that of a random distribution. As a result, there exist a substantial number of opacifying agent particles in close proximity to each other, and possibly in direct physical contact with each other. This phenomenon is known as "crowding", and it diminishes light scattering. In order to reduce grit formation, high shear force manufacturing processes are employed. In addition, significant quantities of surface-active dispersing, wetting or "coupling" agents are employed to reduce grit formation and crowding.

Another approach for reducing the crowding of opacifying agent particles is the use of polymer latex binders that adsorb onto opacifying agent particles so that the resulting composite particles are well spaced out. Polymer latex binders with phosphate functional groups are particularly well suited for latex adsorption onto opacifying agent particles. These phosphate-functional polymer latex binders have such a high affinity for surface treated titanium dioxide however, that if the kinetics of adsorption are not controlled, the composite particles will aggregate causing unacceptable viscosity increases, and the formation of undesirable grit. It is therefore desirable to control the kinetics of adsorption of polymer latex binders onto the opacifying agent particles. It is also desirable to have a method for making coating compositions in which the viscosity is stable, and where grit formation and crowding is minimized.

SUMMARY

Disclosed herein is a method comprising mixing opacifying agent particles with a thickening agent to form a first mixture; the mixing being conducted at a shear rate of about 10 to about 2,000 sec$^{-1}$; the first mixture having a viscosity of greater than or equal to about 70 Krebs units; and mixing a polymer latex binder with the first mixture to form a coating composition; the polymer latex binder comprising a copolymer that comprises phosphorus containing repeat units and an acrylate polymer.

Disclosed herein too is a method comprising mixing opacifying agent particles with a first portion of a thickening agent to form a first mixture; the mixing of the first mixture being conducted at a first shear rate of about 10 to about 2,000 sec$^{-1}$; mixing a first additive composition with the first mixture to form a second mixture; the first additive composition being added in a first portion and a second portion; the first portion comprising a dispersant, a nonionic surfactant, a buffering agent, a defoamer and a liquid medium; the second portion comprising an inorganic surfactant, an extender and a clay thickener; and mixing a second additive composition with the second mixture to form the coating composition; the second additive composition comprising the liquid medium, an opaque polymer, a polymer latex binder, a defoamer, a coalescent, preservatives, a second portion of the thickening agent; the polymer latex binder comprising a copolymer that comprises phosphorus-containing repeat units and an acrylate polymer.

Disclosed herein too is a coating composition and a coating manufactured from the aforementioned first mixture and by the aforementioned methods.

The above-described embodiments are described in further detail below.

BRIEF DESCRIPTION OF THE FIGURES

Referring now to the figures, which are exemplary embodiments and wherein the like elements are numbered alike.

DETAILED DESCRIPTION

It is to be noted that as used herein, the terms "first," "second," and the like do not denote any order or importance, but rather are used to distinguish one element from another, and the terms "the", "a" and "an" do not denote a limitation of quantity, but rather denote the presence of a of the referenced item. Furthermore, all ranges disclosed herein are inclusive of the endpoints and independently combinable. The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Disclosed herein is a method of making a coating composition in which the kinetics of adsorption of polymer latex binders onto opacifying agent particles is controlled. This is achieved by first mixing the opacifying agent particles with a thickening agent. The formation of a layer of the thickening agent on the opacifying agent particles shields the surface of the particles from the polymer latex binders used in the coating composition. This effect minimizes the aggregation of particles brought about by polymer-particle interaction. The mixing of the opacifying agent particles with a thickening agent is advantageous in that it can be conducted at a low shear rate of less than or equal to about 2,000 seconds$^{-1}$ (sec$^{-1}$). It is also advantageous because it permits the use of low shear mixing in other stages of the manufacturing process.

The mixing of the opacifying agent particles with the thickening agent produces a coating that facilitates dispersion of the opacifying agents in a coating. As a result, the coating is free from crowding and grit formation. The opacifying agent particles in the coatings are effectively dispersed to achieve maximum light scattering and opacity. In comparative commercial processes, the thickening agent is always added to the coating composition in a final step as a viscosity modifier. As a result, comparative coating compositions always display grit, especially when formulated under low shear conditions, which is undesirable.

The coating composition can be manufactured by a variety of different methods. Disclosed herein are two exemplary methods by which the coating composition can be manufactured. In one embodiment, the first method comprises mixing opacifying agent particles with the thickening agent in an optional liquid medium in a first reactor to form a first mixture. The formation of the first mixture is conducted at a first shear rate of less than or equal to about 2,000 (1/seconds) sec$^{-1}$. To the first mixture is added a first additive composition to form a second mixture. The first additive composition comprises a surfactant, the liquid medium, a dispersant, a nonionic surfactant, a buffering agent, a coalescent, a defoamer, an extender, a clay thickener, or a combination comprising at least one of the foregoing additives. The first additive composition may be added in a first portion and a second portion. The second mixture is mixed at a second shear rate of about 10 to about 10,000 sec$^{-1}$.

The second mixture is optionally transferred to a second reactor. To the second mixture is added a second additive composition to form the coating composition. The second additive composition comprises a polymer latex binder, the liquid medium, an opaque polymer, a coalescent, a preservative, an additional thickening agent, or a combination comprising at least one of the foregoing additives. The coating composition is mixed at the second shear rate.

The second method of making the coating composition comprises mixing the opacifying agent particles with the thickening agent in an optional liquid medium in the first reactor to form the first mixture. The formation of the first mixture is conducted at a first shear rate of less than or equal to about 2,000 sec$^{-1}$. In a second reactor, the first portion and the second portion are mixed together to form the first additive composition. The first additive composition is then mixed into the first mixture to form the second mixture. The second mixture is mixed at the second shear rate of about 10 sec$^{-1}$ to about 10,000 sec$^{-1}$. The second additive composition is added to the second mixture to form the coating composition. The mixing of the second additive composition with the second mixture is conducted at the second shear rate.

Figure 1:
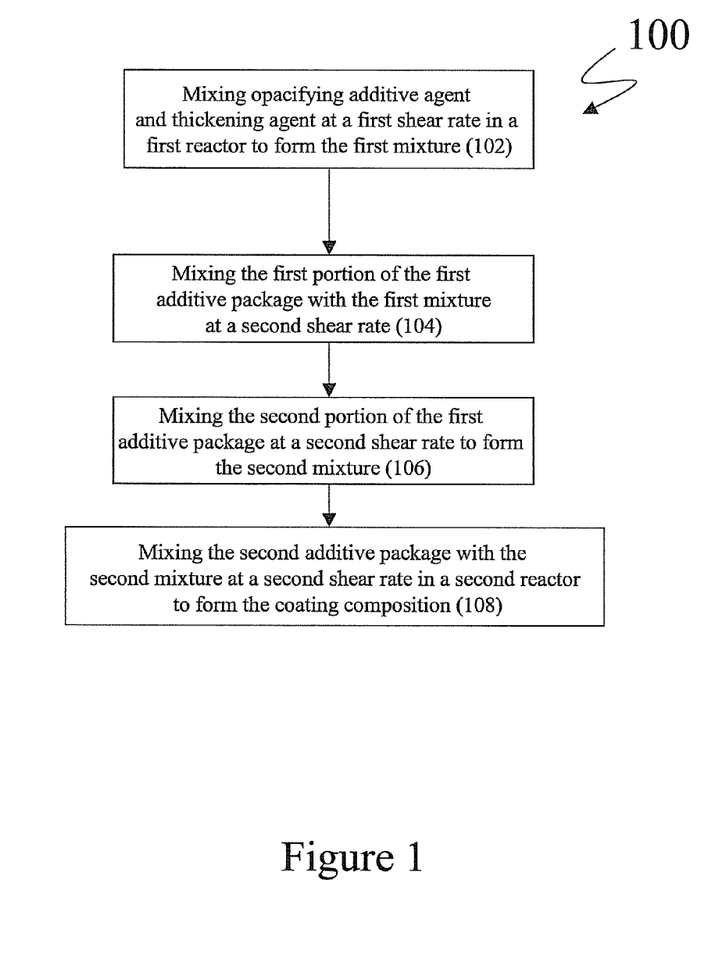
FIG. 1 illustrates the first method for making a coating composition.

With reference to the FIG. 1, the first method 100 for making the coating composition is now described in further detail. As shown in block 102, the opacifying agent particles, the thickening agent and the optional liquid medium are mixed in a first reactor at a first shear rate to form the first mixture. The mixing is conducted by subjecting the opacifying agent particles, the thickening agent and the liquid medium to shear forces in the first reactor.

The first shear rate is less than or equal to about 2,000 l/seconds (sec$^{-1}$). Specifically, the first shear rate is about 1 to about 1,900 sec$^{-1}$, and more specifically about 10 to about 1,000 sec$^{-1}$. The first mixture is mixed for about 1 to about 120 minutes, specifically for about 3 to about 60 minutes, and more specifically for about 5 to about 30 minutes.

The viscosity of the first mixture is about 70 to about 130 Krebs units (KU), and specifically about 90 to about 110 KU as measured according to KU Digital Viscometer at a temperature of 25° C.

To the first mixture is added the first additive composition to form the second mixture as shown in the blocks 104 and 106. In one embodiment, the first additive composition may be divided into a plurality of portions with each portion being added to the reactor while its contents are being mixed. In an exemplary embodiment, the first additive composition may be added in a first portion (depicted in block 104) and a second additive portion (depicted in block 106).

The second mixture is manufactured in the first reactor while mixing at a second shear rate. The first additive composition comprises a variety of different additives, the additives being a dispersant, a nonionic surfactant, a buffering agent, a defoamer and additional liquid media, an inorganic surfactant, an extender and a clay thickener or a combination comprising at least of the foregoing additives.

As noted above, the first additive composition can be divided into two portions, a first portion and a second portion. The first portion of the first additive composition comprises the dispersant, the nonionic surfactant, the buffering agent, the defoamer and additional liquid media while the second portion of the first additive comprises an inorganic surfactant, an extender and a clay thickener. During the addition of the first portion and/or after the addition of the second portion, the contents of the reactor are mixed at a second shear rate.

The second shear rate during the formation of the second mixture is higher than the first shear rate employed during the formation of the first mixture. The second shear rate can be about 10 to about 10,000 sec$^{-1}$, specifically about 50 to about 2,000 sec$^{-1}$, and more specifically about 100 to about 1,500 sec$^{-1}$.

As can be seen in the block 108, the second mixture is then transferred to the second reactor, where it is mixed at the second shear rate. In one embodiment, the first reactor can be the same as the second reactor. In other words, the transferring to the second reactor is optional and may be avoided if desired. A second additive composition is then added to the second mixture to form the coating composition as depicted in block 110. The second additive composition comprises the liquid medium, an opaque polymer, a polymer latex binder, a defoamer, a coalescent, preservatives, additional thickening agent or a combination comprising at least one of the foregoing additives.

The viscosity of the coating composition is about 80 to about 110 KU, and specifically about 85 to about 105 KU as measured according to KU Digital Viscometer at a temperature of 25° C.

Figure 2:
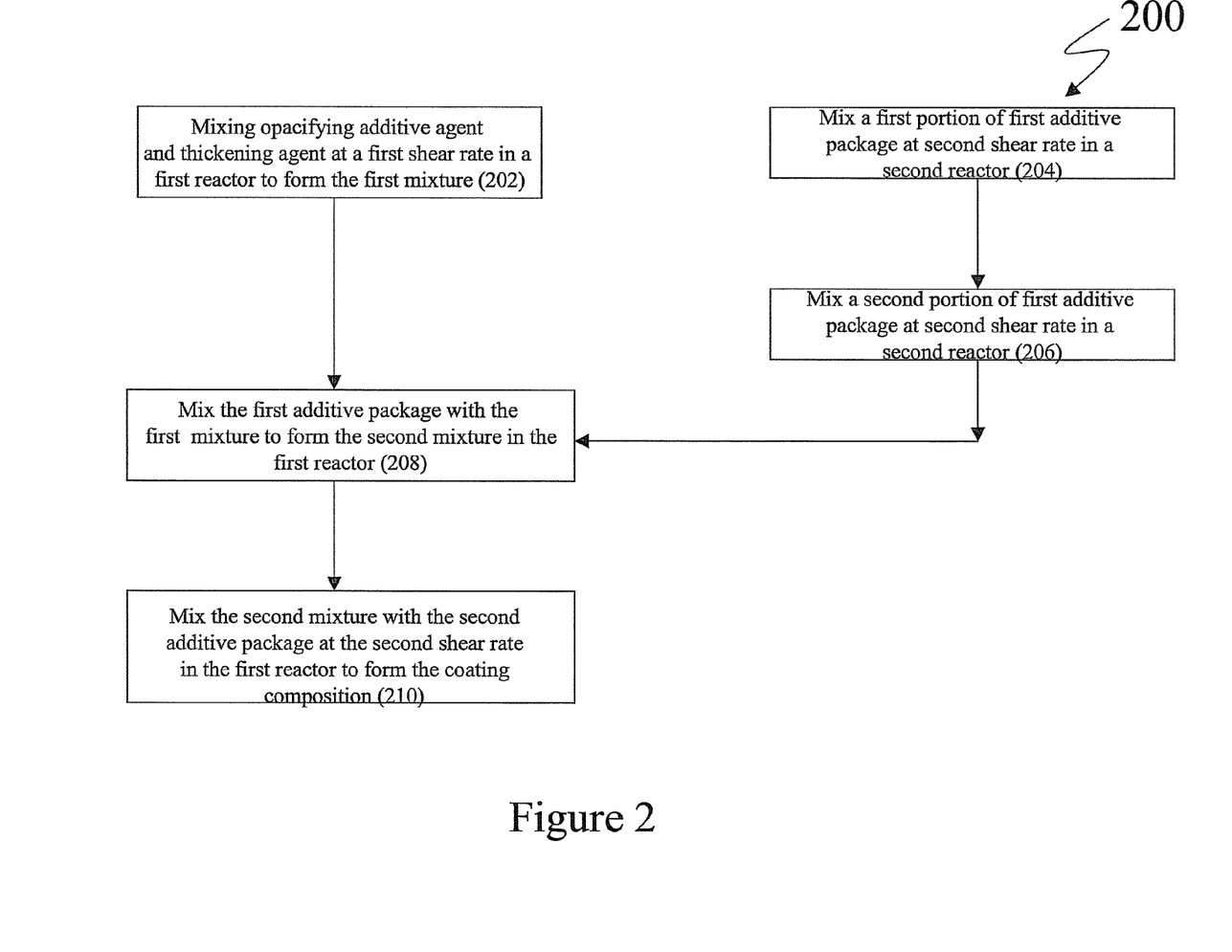
FIG. 2 illustrates the second method for making a coating composition.

With reference now the FIG. 2, the second method 200 for making the coating composition is now described in further detail. As shown in the block 202, the opacifying agent particles and thickening agent are mixed in a first reactor at the first shear rate to form the first mixture. As noted above, the first shear rate is less than or equal to about 2,000 sec$^{-1}$.

In a separate reactor (e.g., the second reactor), the first portion of the first additive composition is then subjected to mixing as shown in block 204. As shown in block 206, the second portion of the first additive composition is then added to the second reactor followed by additional mixing to form the first additive composition. The respective mixing of the first portion and the second portions to form the first additive composition is conducted at the second shear rate of about 10 to about 10,000 sec$^{-1}$.

As shown in block 208, the first additive composition is then added to the first mixture in the first reactor or the second reactor to form the second mixture. In an exemplary embodiment, the mixing of the first additive composition with the first mixture is conducted in the first reactor at the second shear rate. To the second mixture is added the second additive composition to form the coating composition as shown in block 210. The mixing to form the coating composition is conducted at the second shear rate.

The first reactor and the second reactor are used to apply shear forces to manufacture the first mixture, the first additive package, the second additive package, the second mixture and the coating composition. In addition to shear forces, other forces and forms of energy such as extensional forces, compressive forces, ultrasonic energy, electromagnetic energy, thermal energy or combinations comprising at least one of the foregoing forces or forms of energy are imparted to manufacture the coating composition. The aforementioned forces or forms of energy can be exerted upon the respective mixtures and compositions by a single screw, multiple screws, intermeshing co-rotating or counter rotating screws, non-intermeshing co-rotating or counter rotating screws, reciprocating screws, screws with pins, screws with screens, barrels with pins, rolls, rams, helical rotors, impellers, polypellers, or combinations comprising at least one of the foregoing.

In an exemplary embodiment, the aforementioned forces or forms of energy are exerted upon the ingredients by impellers, propellers and/or polypellers. Examples of impellers are gate blades, flat blades, sweep blades, high shear Cowles blade, hi vane blades, pick blades, axial turbines, or the like.

The first reactor and the second reactor can be a single or multiple screw extruder, a single or multiple screw extruders fitted with ultrasonic horns, a Buss kneader, a Henschel mixer, a helicone, a Ross mixer, a Banbury mixer, a roll mill, a letdown tank, a blend tank, a grind mill tank, or the like. In an exemplary embodiment, the mixing is conducted in a letdown/blend tank and/or a grind mill tank.

In one embodiment, the first reactor is a let down tank or a blend tank, while the second reactor is a grind tank or a mill tank. In another embodiment, the first reactor is a grind tank or a mill tank, while the second reactor is a let down tank or a blend tank.

When the mixing is conducted in a let down tank or a blend tank that uses an impeller, to transmit shear forces, it is desirable to use a stirring shaft comprising a plurality of impellers. In an exemplary embodiment, the stirring shaft has an upper, middle, and lower impeller each having a diameter of about 1 to about 100 inches, about 1 to about 200 inches, and about 1 to about 200 inches, respectively. The impellers operate at a rotational speed of about 30 to about 500 revolutions per minute. The impellers are of the curved blade turbine or pitched blade type, where the pitch is about 30 to about 60 degrees. In one embodiment, the let down tank or a blend tank can have an operating volume of about 4 to about 15,000 gallons.

When the mixing is conducted in a grind tank or mill tank, a polypeller having a blade diameter of about 5 to about 50 inches, specifically about 10 to about 40 inches, and more specifically about 15 to about 35 inches can be used. The polypeller can operate at a rotational speed of about 100 to about 2,000 revolutions per minute, specifically about 200 to about 1800 revolutions per minute and more specifically about 500 to about 1500 revolutions per minute. In one embodiment, the grind tank or mill tank can have an operating volume of about 500 to about 5,000 gallons.

The components of the coating compositions will now be described. The function of opacifying agent particles in a coating composition is to hide the substrate from view. Opacifying agent particles scatter, reflect, or absorb light to prevent the light from reaching the substrate. Examples of opacifying agent particles are pigments, extenders, fillers, or the like, or combinations comprising one or more of the foregoing opacifying agent particles.

Examples of pigments are metal oxides. Examples of metal oxides are titanium dioxide, zinc oxide, iron oxide, or the like, or a combination comprising at least one of the foregoing metal oxides. In an exemplary embodiment, the metal oxide is titanium dioxide. Titanium dioxide exists in two crystal forms, anastase and rutile. Examples of commercially available rutile titanium dioxide are KRONOS® 2310, available from Kronos Worldwide, Inc. (Cranbury, N.J.), Ti-Pure® R-900, available from DuPont (Wilmington, Del.), or TiONA® AT1 commercially available from Millenium Inorganic Chemicals. Titanium dioxide is also available in concentrated dispersion form. An example of a titanium dioxide dispersion is KRONOS® 4311, also available from Kronos Worldwide, Inc.

The opacifying agent particles have average particle sizes of about 0.001 to about 100 micrometers (µm), specifically about 0.005 to about 50 µm, and more specifically about 0.01 to about 10 µm. The opacifying agent particles also have a surface area of about 0.1 to about 200 square meters per gram (m$^2$/g), specifically about 2 to about 100 m$^2$/g and more specifically about 5 to about 50 m$^2$/g.

The opacifying agent particles may be used in the form of dry particles (hereinafter dry opacifying agent particles) or may be used in the form of a slurry (hereinafter opacifying agent particle slurry). When dry opacifying agent particles are used, they are present in the coating composition in an amount of up to about 90% weight percent (wt %) based upon the total weight of the first mixture. In one embodiment, the dry opacifying agent particles are present in an amount of about 1 wt % to about 85% wt %, specifically about 3 to about 75% wt %, and more specifically about 5 to about 65% wt %, based on the total weight of the first mixture.

As noted above, the opacifying agent particles can also be used in the form of a slurry. The slurry generally comprises the opacifying agent particles, defoamers, anionic/nonionic surfactants, buffering agents and preservatives. When the opacifying agent particle slurry is used, it is present in the coating composition in an amount of up to about 35 weight percent (wt %) based upon the total weight of the coating composition. In one embodiment, the opacifying agent particles are present in an amount of about 1 wt % to about 32 wt %, specifically about 5 to about 30 wt %, and more specifically about 7 to about 28 wt %, based on the total weight of the coating composition.

Extenders (fillers) can also be used. The extenders may optionally be added along with the opacifying agent particles. They are added as part of the first portion of the first additive composition. They are naturally occurring minerals and synthetic inorganic pigments that are relatively colorless in coatings. They can be used in combination with more expensive opacifying agent particles such as, for example, metal oxides, to reduce raw material costs. Suitable extenders are nepheline syenite, (25% nepheline, 55% sodium feldspar, and 20% potassium feldspar), feldspar (an aluminosilicate), diatomaceous earth, calcined diatomaceous earth, calcium carbonate, talc (hydrated magnesium silicate), aluminosilicates, silica (silicon dioxide), alumina (aluminum oxide), clay, (hydrated aluminum silicate), kaolin (kaolinite, hydrated aluminum silicate), mica (hydrous aluminum potassium silicate), pyrophyllite (aluminum silicate hydroxide), perlite, baryte (barium sulfate), wollastonite (calcium metasilicate), or the like, or a combination comprising at least one of the foregoing extenders. In an exemplary embodiment, the extenders that can be used are nepheline syenite, calcined diatomaceous earth, or the like, or combinations comprising one or more of the foregoing extenders.

The extenders have average particle sizes of about 0.001 to about 1000 μm, specifically about 0.01 to about 500 μm, and more specifically about 1 to about 100 μm. In another embodiment, the extenders have a surface area of about 0.1 to about 200 $m^2/g$, specifically about 2 to about 100 $m^2/g$ and more specifically about 5 to about 50 $m^2/g$.

The extenders, when present, are generally used in amounts of about 0.1 to about 50 wt %, specifically about 0.5 to about 20 wt %, and more specifically about 1 to about 12 wt %, based on the total weight of the coating composition.

A thickening agent is used to control the kinetics of adsorption of polymer latex binders onto the opacifying agent particles. The use of the thickening agent is advantageous in that grit formation is minimized, and that the polymer latex binder added in a subsequent step then efficiently spaces apart the opacifying agent particles for maximum light scattering and opacity in the final coating. The thickening agent is added to the first mixture without any additives or dispersants. Examples of thickening agents are a hydrophobically modified ethylene oxide urethane (HEUR) polymer, a hydrophobically modified alkali soluble emulsion (HASE) polymer, hydrophobically modified hydroxyethyl cellulose (HM-HEC), hydrophobically modified polyacrylamide, or the like, or a combination comprising at least one of the foregoing thickening agents. HEUR polymers are linear reaction products of diisocyanates with polyethylene oxide end-capped with hydrophobic hydrocarbon groups. HASE polymers are homopolymers of (meth)acrylic acid, or copolymers of (meth)acrylic acid, (meth)acrylate esters, or maleic acid modified with hydrophobic vinyl monomers. HMHEC is hydroxyethyl cellulose modified with hydrophobic alkyl chains. Hydrophobically modified polyacrylamides are copolymers of acrylamide with acrylamide modified with hydrophobic alkyl chains (N-alkyl acrylamide). In an exemplary embodiment, the thickening agent is a HEUR polymer, a HASE polymer, or a combination comprising at least one of the foregoing thickening agents.

The thickening agent is present in the first mixture in an amount of about 2 to about 30 wt %, specifically about 7 to about 28 wt %, and more specifically about 9 to about 25 wt %, based on the amount of the dry opacifying agent particles. The thickening agent is present in the first mixture in an amount of about 2 to about 20 wt %, specifically about 3 to about 15 wt %, and more specifically about 4 to about 12 wt %, based on the amount of the opacifying agent particle slurry.

With respect to the coating composition, the thickening agent is present in an amount of about 1 wt % to about 10 wt %, specifically about 2 to about 9 wt %, and more specifically about 3 to about 7 wt %, based on the total weight of the coating composition. The thickening agent is generally added to the coating composition in two portions. The first portion is added during the formation of the first mixture as detailed above while the second portion is added during the last stages of the manufacturing in order to adjust the viscosity of the coating composition.

A liquid medium is optionally used in any of the first or second mixtures or in the coating composition. Liquid media are used to adjust the viscosity of the coating composition. Suitable liquid media are water, water-miscible solvents, and coalescents. Coalescents aid in the formation of a continuous film from the polymer latex binder. Liquid media can also serve as freeze-thaw stabilizers. Examples of freeze-thaw stabilizers are ethylene glycol, propylene glycol, diethylene glycol, or the like, or a combination comprising one or more of the foregoing freeze thaw stabilizers. Suitable coalescents, which aid in film formation during drying, are ethylene glycol monomethyl ether, ethylene glycol monobutyl ether, ethylene glycol monoethyl ether acetate, ethylene glycol monobutyl ether acetate, diethylene glycol monobutyl ether, diethylene glycol monoethyl ether acetate, dipropylene glycol monomethyl ether, 2,2,4-trimethyl-1,3-pentanediol monoisobutyrate, or the like, or a combination comprising at least one of the foregoing coalescents. Specific liquid media are water and ethylene glycol.

The liquid media are generally used in amounts of about 1 to about 30 wt %, specifically about 2 to about 25 wt %, and more specifically about 3 to about 22 wt %, based on the total weight of the coating composition.

As noted above, the first portion of the first additive composition comprises the dispersant, the nonionic surfactant, the buffering agent, the defoamer and additional liquid media while the second portion of the first additive comprises an inorganic surfactant, an extender and a clay thickener. These will now be listed below.

Dispersants can optionally be used. Dispersants aid in the formation of a stable dispersion of the opacifying agent particles. Examples of dispersants are polyacid dispersants and hydrophobic copolymer dispersants. Examples of polyacid dispersants are polycarboxylic acids, which are partially or completely in the form of their ammonium, alkali metal, alkaline earth metal, ammonium, or lower alkyl quaternary ammonium salts. Additional examples of polyacid dispersants are salts of polyacrylic acid, polymethacrylic acid, or the like, or combinations comprising at least one of the foregoing polyacid dispersants. Examples of polyacid dispersants are TAMOL® 850 and 960, sodium salts of polymethacrylic acid, and available from Rohm and Haas Co. (Philadelphia, Pa.).

Hydrophobic copolymer dispersants are copolymers of acrylic acid, methacrylic acid, or maleic acid with hydrophobic monomers. Examples of hydrophobic copolymer dispersants are TAMOL® 731 A and 731 SD, which are sodium salts of maleic acid copolymer with hydrophobic monomers, and are available from Rohm and Haas Co.

The polyacid dispersants or hydrophobic copolymer dispersants, when present, are generally used in amounts of about 0.1 to about 10 wt %, specifically about 0.3 to about 5 wt %, and more specifically about 0.5 to about 2 wt %, based on the total weight of the coating composition.

Nonionic surfactants can optionally be used. Examples of nonionic surfactants are alkylphenoxy polyethoxyethanols having alkyl groups of about 7 to about 18 carbon atoms, and having from about 6 to about 60 oxyethylene units; ethylene oxide derivatives of long chain carboxylic acids; analogous ethylene oxide condensates of long chain alcohols, or the like, or a combination comprising at least one of the foregoing nonionic surfactants. Examples of nonionic surfactants are heptylphenoxypolyethoxyethanols, methyloctyl phenoxypolyethoxyethanols, or the like, or a combination comprising at least one of the foregoing nonionic surfactants. Other nonionic surfactants that can be used are those based on polypropoxypropanol. Examples of polypropoxypropanol-containing nonionic surfactants are alkylphenoxy polypropoxypropanols having alkyl groups of from about 7 to about 18 carbon atoms, and having from about 6 to about 60 oxypropylene units; propylene oxide derivatives of long chained carboxylic acids; analogous propylene oxide condensates of long chain alcohols, or the like, or a combination comprising at least one of the foregoing polypropoxypropanol-containing nonionic surfactants.

The nonionic surfactants, when present, are generally used in amounts of about 0.01 to about 10 wt %, specifically about 0.05 to about 5 wt %, and more specifically about 0.1 to about 1 wt %, based on the total weight of the coating composition.

In addition to nonionic surfactants, anionic surfactants other than inorganic phosphate surfactants, can optionally be used. Examples of anionic surfactants are ammonium, alkali metal, alkaline earth metal, and lower alkyl quaternary ammonium salts of sulfosuccinates, di($C_7$-$C_{25}$)alkylsulfosuccinates, octyl sulfosuccinate, higher fatty alcohol sulfates, lauryl sulfate; aryl sulfonates, alkyl sulfonates, alkylaryl sulfonates, isopropylbenzene sulfonate, isopropylnaphthalene sulfonate, N-methyl-N-palmitoyltaurate; isothionates, oleyl isothionate; alkylarylpoly(ethyleneoxy)ethylene sulfates, sulfonates, t-octylphenoxypoly(ethyleneoxy) ethylene sulfates, or the like, or a combination comprising at least one of the foregoing anionic surfactants.

Buffering agents can also optionally be used. These buffering agents serve to maintain an alkaline pH in the coating composition, and evaporate during the drying of the coating. Examples of buffering agents are amino alcohols, monoethanolamine (MEA), diethanolamine (DEA), 2-(2-aminoethoxy)ethanol, diisopropanolamine (DIPA), 1-amino-2-propanol (AMP), ADVANTEX®, available from Arkema, Philadelphia, Pa.

The buffering agent, when present, is generally used in an amount of about 0.01 to about 5 wt %, specifically about 0.05 to about 3 wt %, and more specifically about 0.1 to about 0.5 wt %, based on the total weight of the coating composition.

Defoamers serve to minimize frothing during mixing of the coating composition. Defoamers can comprise a mineral oil or a silicone oil. An example of a mineral oil based defoamer is Rhodoline® (Colloid) 643, available from Rhodia (Cranbury, N.J.). Examples of silicone oil defoamers are polysiloxanes, polydimethylsiloxanes, polyether modified polysiloxanes, or the like, or combinations comprising at least of the foregoing defoamers. Examples of silicone oil defoamers are BYK®-19, -21, and -22, available from BYK USA Inc. (Wallingford, Conn.), the TEGO® series of defoamers, available from Evonik Industries (Hopewell, Va.), the DREWPLUS® series of defoamers, available from Ashland Inc. (Covington, Ky.), or the like, or a combination comprising at least one of the foregoing silicon-oil based defoamers.

The defoamer, when present, is generally used in an amount of about 0.01 to about 5 wt %, specifically about 0.05 to about 3 wt %, and more specifically about 0.1 to about 0.5 wt %, based on the total weight of the coating composition.

As noted above, the second portion of the first additive comprises an inorganic surfactant, an extender and a clay thickener. The extenders have already been described above. Inorganic phosphate surfactants are used in combination with the thickening agent to stabilize the opacifying agent particles against agglomeration, and grit formation. The surfactant functions by imparting electrostatic repulsion to the opacifying agent particles. Examples of inorganic phosphate surfactants are an alkali metal or ammonium phosphate surfactant such as for example dibasic ammonium phosphate, sodium pyrophosphate, potassium tripolyphosphate (KTPP), sodium tripolyphosphate (STPP), sodium hexametaphosphate, trisodium orthophosphate, and monosodium orthophosphate, a pyrophosphate, a tripolyphosphate, an orthophosphate, a metaphosphate, a hexametaphosphate, or the like, or a combination comprising at least one of the foregoing inorganic phosphate surfactants. An exemplary inorganic phosphate surfactant is potassium tripolyphosphate.

The surfactant is generally used in amounts of about 0.001 to about 2 wt %, specifically about 0.005 to about 1 wt %, and more specifically about 0.1 to about 0.5 wt %, based on the total weight of the coating composition.

Clay thickeners can also be used. Clay thickeners are thixotropic additives. They reduce settling, provide sagging resistance, and impart shear-thinning in coating compositions. Suitable clay thickeners are attapulgite (magnesium aluminum phyllosilicate), bentonite (aluminum phyllosilicate), or the like, or a combinations comprising at least one of the foregoing clay thickeners.

The clay thickeners, when present, are generally used in an amount of about 0.01 to about 10 wt %, specifically about 0.05 to about 5 wt %, and more specifically about 0.1 to about 0.8 wt %, based on the total weight of the coating composition.

As noted above, a second additive composition is added to the second mixture to produce the coating composition. The second additive composition comprises the liquid medium, opaque polymers, a polymer latex binder, a defoamer, a coalescent, a mildewcide, and a second portion of the thickening agent. The liquid medium, defoamer, coalescent and thickening agent have already been described above.

Opaque polymers can also be used. Opaque polymers are hollow-sphere polymeric pigments. They are non-film forming emulsion polymers containing a water-filled void. During the drying of the coating composition, the water in the void diffuses through the polymer shell and leaves an air void. Due to the difference in refractive index between air and the surrounding polymer, light is effectively scattered, contributing to coating opacity. Examples of opaque polymers are RHOPAQUE® OP-62 LOE, OP-3000 and Ultra E, available from Rohm and Haas, Company.

The opaque polymers, when present, are generally used in an amount of about 0.1 to about 20 wt %, specifically about 1 to about 15 wt %, and more specifically about 3 to about 9 wt %, based on the total weight of the coating composition.

The polymer latex binder advantageously affords both scrub and stain-resistant coating compositions. The polymer latex binder comprises a copolymer that comprises phosphorus containing repeat units and an acrylate polymer. The polymer latex binder is a dispersion of a copolymer comprising about 0.5 to about 2.0 wt % of phosphorus-containing monomers; greater than or equal to about 20 wt % of ethyl acrylate, methyl acrylate, or combinations of ethyl acrylate and methyl acrylate; and less than or equal to about 79.5 wt % of one or more mono-ethylenically unsaturated monomers, the mono-ethylenically unsaturated monomers excluding the phosphorus-containing monomer, ethyl acrylate and methyl acrylate. All monomer weight percent values are based on the total weight of the copolymer.

Examples of phosphorus-containing monomers are dihydrogen phosphate esters of an alcohol in which the alcohol contains a polymerizable vinyl or olefenic group, allyl phosphate, phosphoalkyl(meth)acrylates, 2-phosphoethyl(meth)

acrylate, 2-phosphopropyl(meth)acrylate, 3-phosphopropyl(meth)acrylate, phosphobutyl(meth)acrylate, 3-phospho-2-hydroxypropyl(meth)acrylate, mono- or di-phosphates of bis (hydroxymethyl) fumarate or itaconate; phosphates of hydroxyalkyl(meth)acrylate, 2-hydroxyethyl(meth)acrylate, 3-hydroxypropyl(meth)acrylate, ethylene oxide condensates of (meth)acrylates, $H_2C=C(CH_3)COO(CH_2CH_2O)_nP(O)(OH)_2$, and analogous propylene oxide condensates where n is an amount of 1 to about 50, phosphoalkyl crotonates, phosphoalkyl maleates, phosphoalkyl fumarates, phosphodialkyl (meth)acrylates, phosphodialkyl crotonates, vinyl phosphonic acid, allyl phosphonic acid, 2-acrylamido-2-methylpropanephosphinic acid, α-phosphonostyrene, 2-methylacrylamido-2-methylpropanephosphinic acid, (hydroxy)phosphinylalkyl(meth)acrylates, (hydroxy)phosphinylmethyl methacrylate, or the like, or a combination comprising at least one of the foregoing phosphorus-containing monomers. The phosphorus-containing monomers are polymerized to form phosphorus-containing repeat units. A specific phosphorus-containing monomer is 2-phosphoethyl methacrylate (PEM).

The copolymer comprises from about 0.5 to about 2.0 wt %, specifically about 0.8 to about 1.6 wt %, and more specifically about 0.9 to about 1.25 wt % of the phosphorous-containing monomer, based on the total weight of the copolymer.

The copolymer comprises less than or equal to about 79.5 wt % of one or more mono-ethylenically unsaturated monomers, excluding the phosphorus-containing monomer, ethyl acrylate, and methyl acrylate. Examples of mono-ethylenically unsaturated monomers are β-dicarbonyl monomers and cyanocarbonyl monomers. The term "β-dicarbonyl monomer" refers to ethylenically unsaturated acetoacetoxy-functional monomers and ethylenically unsaturated acetoacetamido-functional monomers, and the term "cyanocarbonyl monomer" refers to ethylenically unsaturated cyanoacetoxy-functional monomers, and ethylenically unsaturated cyanoacetamido-functional monomers.

Acetoacetoxy-functional monomers are monomers having structure I;

(I)

acetoacetamido-functional monomers having structure II;

A-NH—C(=O)—CH(R_1)—C(=O)—B (II)

functional monomers having structure III; and

A-C(=O)—CH(R_1)—CN (III)

cyanoacetamido-functional monomers having structure IV,

A-NH—C(=O)—CH(R_1)—CN (IV)

wherein $R_1$ is either H, alkyl having 1 to 10 carbon atoms, or phenyl; A is either structure V or structure VI;

(V)

(VI)

where $R_2$ is either a hydrogen, an alkyl having 1 to 10 carbon atoms, a phenyl, a substituted phenyl, a halogen, a $CO_2CH_3$, or CN; $R_3$ is either a H, an alkyl having 1 to 10 carbon atoms, a phenyl, a substituted phenyl or a halogen; $R_4$ is either an alkylene, a substituted alkylene having 1 to 10 carbon atoms, a phenylene or a substituted phenylene; $R_5$ is either an alkylene or a substituted alkylene having 1 to 10 carbon atoms; a, m, n, p, and q are independently either 0 or 1; X and Y are independently either —NH— or —O—; and B is either A listed in structures (v) or (Vi) above, an alkyl having 1 to 10 carbon atoms, a phenyl, a substituted phenyl or a heterocyclic molecule.

Examples of acetoacetoxy-functional monomers are acetoacetoxyethyl(meth)acrylate, acetoacetoxypropyl(meth)acrylate, allyl acetoacetate, acetoacetoxybutyl(meth)acrylate, 2,3-di(acetoacetoxy)propyl(meth)acrylate, vinyl acetoacetate, or the like, or a combination comprising at least one of the foregoing acetoxy-functional monomers. Examples of acetoacetamido-functional monomers are acetoacetamidoethyl(meth)acrylate, acetoacetamidopropyl(meth)acrylate, acetoacetamidobutyl(meth)acrylate, 2,3-di(acetoacetamido)propyl(meth)acrylate, allyl acetoacetamide, vinyl acetoacetamide, or the like; or a combination comprising at least one of the foregoing acetoacetamido-functional monomers. Examples of cyanoacetoxy-functional monomers are cyanoacetoxyethyl(meth)acrylate, cyanoacetoxypropyl(meth)acrylate, cyanoacetoxybutyl(meth)acrylate, 2,3-di(cyanoacetoxy)propyl(meth)acrylate, allyl cyanoacetate, vinyl cyanoacetate or the like; or a combination comprising at least one of the foregoing cyanoacetoxy-functional monomers. Examples of cyanoacetamido-functional monomers are cyanoacetamidoethyl(meth)acrylate, cyanoacetamidopropyl(meth)acrylate, cyanoacetamidobutyl(meth)acrylate, 2,3-di(cyanoacetamido)propyl(meth)acrylate, allyl cyanoacetamide, vinyl cyanoacetamide, or the like, or a combination comprising at least one of the foregoing cyanoacetamido-functional monomers. A specific example of a cross-linking monomer is acetoacetoxyethyl methacrylate (AAEM). The terms "(meth)acrylic" and "(meth)acrylate" refer to acrylic or methacrylic, and acrylate or methacrylate, respectively.

The copolymer comprises about 0.5 to about 5.0 wt %, specifically about 1.0 to about 3.0 wt %, and more specifically about 1.5 to about 2.5 wt % of β-dicarbonyl monomer, cyanocarbonyl monomer, or a combination comprising at least one of the foregoing copolymers.

As noted above, the copolymer comprises less than or equal to about 79.5 wt % of one or more mono-ethylenically unsaturated monomers excluding the phosphorus-containing monomer, ethyl acrylate, and methyl acrylate. Another example of a mono-ethylenically unsaturated monomer is an acid-functional or anionic monomer. "Acid-functional or anionic monomer" refers to ethylenically unsaturated monomers containing acid groups or their salts, except for phosphorus-containing acid groups (or their salts). Examples of acid-functional or anionic monomers are monomers bearing carboxylic acid groups and sulfur acid groups or their respective anions, acrylic acid, methacrylic acid, crotonic acid, itaconic acid, fumaric acid, maleic acid, mono-ester derivatives of diacids, monomethyl itaconate, monomethyl fumarate, monobutyl fumarate, maleic anhydride, 2-acrylamido-2-methyl-1-propanesulfonic acid, sulfoethyl(meth)acrylate, styrene sulfonic acid, vinyl sulfonic acid, or the like, or a combinations comprising at least one of the foregoing acid functional or anionic monomers. A specific example of an acid functional or anionic monomers is methacrylic acid.

Other mono-ethylenically unsaturated monomers are (meth)acrylic esters such as, for example, C1 to C40 esters of (meth)acrylic acid, methyl methacrylate, ethyl methacrylate, butyl(meth)acrylate, 2-ethylhexyl(meth)acrylate, decyl (meth)acrylate, lauryl(meth)acrylate, stearyl(meth)acrylate, isobornyl(meth)acrylate; hydroxyalkyl esters of (meth)acrylic acid, hydroxyethyl(meth)acrylate, hydroxypropyl (meth)acrylate; (meth)acrylamide, propenamide, dimethylacrylamide; (meth)acrylonitrile; amino-functional and ureido-functional monomers; acid-functional or anionic monomers; monomers bearing acetoacetate-functional groups; α-olefins, 1-decene; styrene, substituted styrenes; vinyl esters, vinyl acetate, vinyl butyrate; vinyl monomers, vinyl chloride, vinyl toluene, vinyl benzophenone; vinylidene chloride; N-vinyl pyrrolidone; ethylene, propylene, butadiene, or the like, or a combination comprising at least one of the foregoing monomers.

The copolymer can comprise from about 0.1 to about 2.0 wt %, specifically from about 0.2 to about 1.0 wt %, and more specifically from about 0.4 to about 0.6 wt %, of acid-functional or anionic monomer, based on the total weight of the copolymer.

The polymer latex binder is commercially available under the trade name AVANSE®, from Rohm and Haas Co. The polymer latex binder is used in amounts of about 10 to about 75 wt %, specifically about 15 to about 65 wt %, and more specifically about 35 to about 50 wt %, based on the total weight of the coating composition.

Mildewcides can optionally be used. Mildewcides inhibit the growth mildew or its spores in the coating. Examples of mildewcides are 2-(thiocyanomethylthio)benzothiazole, 3-iodo-2-propynyl butyl carbamate, 2,4,5,6-tetrachloroisophthalonitrile, 2-(4-thiazolyl)benzimidazole, 2-N-octyl-4-isothiazolin-3-one, diiodomethyl p-tolyl sulfone, or the like, or a combinations comprising at least one of the foregoing mildewcides.

The mildewcide, when present, is generally used in amounts of about 0.01 to about 2 wt %, specifically about 0.05 to about 1.5 wt %, and more specifically about 0.1 to about 0.8 wt %, based on the total weight of the coating composition.

In-can biocides that inhibit the growth of bacteria and other microbes in the coating composition during storage are also used in the coating composition. Examples of in-can biocides are 2-[(hydroxymethyl)amino]ethanol, 2-[(hydroxymethyl)amino]2-methyl-1-propanol, o-phenylphenol, sodium salt, benzoisothiazolin-3-one (BIT), benzoisothiazolin-3-one, lithium salt, 2-methyl-4-isothiazolin-3-one (MIT), 5-chloro-2-methyland-4-isothiazolin-3-one (CIT), 2-octyl-4-isothiazolin-3-one (OIT), 4,5-dichloro-2-n-octyl-3-isothiazolone, or the like, or a combinations comprising at least one of the foregoing in-can biocides. Commercially available in-can biocides are (DCOIT), or NUOSEPT®95, available from ISP (Wayne, N.J.).

The biocide, when present, is generally used in an amount of about 0.01 to about 1 wt %, specifically about 0.05 to about 0.8 wt %, and more specifically about 0.1 to about 0.5 wt %, based on the total weight of the coating composition.

As noted above, the thickening agent is added in two portions—a first portion and a second portion. The second portion is added to the second mixture as part of the second additive package. The addition of the second portion of thickening agent is to facilitate viscosity control for the coating composition. The thickening agent added as part of the second additive package constitutes about 0.1 to about 5 wt %, specifically 0.15 to about 3 wt %, and more specifically about 0.2 to about 1.0 wt %, based on the total weight of the coating composition.

The coating compositions disclosed herein have a number of advantages over other commercially available coating compositions. In one embodiment, the kinetics of adsorption of polymer latex binders onto opacifying agent particles is controlled. This results in less crowding or grit formation when compared with other comparative commercially available compositions. In addition, the direct mixing of the thickening agent with the opacifying agent particles permits the use of lower shear rate processes and equipment which results in lower production and capital investment costs.

The method for making a coating composition will now be described by example. These examples are set forth as representative. They are not to be construed as limiting the scope of the invention as these and other equivalent embodiments will be apparent in view of the present disclosure and appended claims.

EXAMPLES

These examples ware conducted to demonstrate the methods of manufacturing coating compositions as disclosed herein. Both methods of manufacturing the coating compositions are described in these examples. Corresponding comparative examples are also disclosed and the coatings produced by the respective coating compositions are compared with one another.

Example 1

This example was conducted to demonstrate the first method of manufacturing the coating composition. As noted above, the method embodies first mixing the opacifying agent particles with the thickening agent prior to adding other components of the coating composition. For this example, the first reactor was a grind/mill tank while the second reactor was a letdown/blend tank.

A titanium dioxide slurry KRONOS 4311® commercially available from Kronos and HEUR/HASE associative thickener were mixed in a grind/mill tank (i.e., the first reactor) at 500 revolutions per minute (rpm) for 5 minutes to produce the first mixture. The grind/mill tank is equipped with a stirring shaft configured with a single Polypeller™ impeller having a diameter of 2.5 inches, available from KMI Systems of Crystal Lake, Ill. The shear rate was 50 sec$^{-1}$. The viscosity of the first mixture is 90 KU. The composition and the various processes involved in the manufacturing of this coating composition are shown in the Table 1.

The first portion of the first additive composition is then added to the first mixture in the grind/mill tank. The first portion comprises water, ethylene glycol, copolymer dispersant, nonionic surfactant, amino alcohol and the defoamer. The first portion of the first additive composition is mixed at 1000 revolutions per minute for 5 minutes. Following this, the second portion of the first additive composition is added to the grind/mill tank. The second portion of the second additive composition comprises an inorganic phosphate surfactant, nepheline syenite, attapulgite clay, and calcined diatomaceous earth. The resulting mixture is mixed at 1500 revolutions per minute for 20 minutes to form the second mixture. The shear rate is 200 sec$^{-1}$.

The second mixture is then transferred to a letdown/blend tank (i.e., the second reactor) and mixed at 100 revolutions per minute. The letdown/blend tank is equipped with a stirring shaft configured with an upper and lower impeller. The impellers are of the curved blade turbine or pitched blade type, wherein the pitch is from about 30 to about 60 degrees. The upper impeller has a diameter of 5.5 inches, while the lower impeller has a diameter of 6.8 inches.

To the second mixture is added the second additive composition in the letdown/blend tank to form the coating composition. The second additive composition comprises water, an opaque polymer, AVANSE® polymer latex binder (commercially available from Rohm and Haas Co.), a coalescent, a mildewcide, an in-can biocide and the second portion of the HEUR/HASE associative thickener. During the addition of the second additive composition, stirring is conducted in the letdown/blend tank at 150 revolutions per minute for 15 minutes to form the coating composition. The coating composition has a viscosity of 95 KU.

cesses, the thickening agent is added during the final steps of manufacturing of the coating composition. The opacifying agent particles are therefore never afforded an opportunity to develop a monolayer of the thickening agent on their surfaces and this facilitates crowding and the formation of grit. The procedure of Example 1 is followed, except that no HEUR/HASE thickening agent is not added to the first mixture and no inorganic phosphate surfactant is added to the second portion of the first additive composition. The comparative coating composition #1 along with the various process involved in the manufacturing process is shown in the Table 2.

The comparative coating composition #1 is manufactured by pouring a titanium dioxide slurry into the grind/mill tank. To the titanium dioxide slurry in the grind/mill tank is added the first portion of the first additive composition. The mixing is conducted at a speed of 500 revolutions per minute for 5 minutes. Following this, the second portion of the first additive composition is added to the grind mill tank. Additional

TABLE 1

| Composition Name (Reactor) | Materials | Physical Operation | Wt % based on total weight of the coating composition |
|---|---|---|---|
| First Mixture (Grind/Mill Tank) | Titanium dioxide slurry | Add to Grind Mill tank. Mix for 5 minutes at 500 rpm. | 20.00 |
| | HUER/HASE thickening agent | | 1.00 |
| First Portion of First Additive Composition (Grind/Mill Tank) | Water | Mix for 10 minutes at 1000 rpm. | 12.25 |
| | Ethylene glycol | | 2.00 |
| | Dispersant | | 0.10 |
| | Nonionic surfactant | | 0.50 |
| | Amino alcohol | | 0.05 |
| | Defoamer | | 0.50 |
| Second Portion of First Additive Composition (Grind/Mill Tank) | Inorganic surfactant | Mix for 20 minutes at 1500 rpm. | 0.05 |
| | Nepheline syenite | | 12.0 |
| | Attapulgite clay | | 0.50 |
| | Calcined diatomaceous earth | | 5.00 |
| Second Mixture (Letdown/Blend Tank) | | Transfer the Second Mixture to Letdown/Blend Tank | |
| Second Additive Composition (Letdown/Blend Tank) | Water | Mix for 15 minutes at 150 rpm. | 4.00 |
| | Opaque polymer | | 6.00 |
| | AVANSE ® polymer latex binder | | 30.00 |
| | Defoamer | | 0.50 |
| | Coalescent | | 1.00 |
| | Mildewcide | | 0.50 |
| | In-can biocide | | 0.05 |
| | HEUR/HASE thickening agent | | 4.00 |
| Coating Composition | | | 100 |

Comparative Example 1

The comparative compositions were manufactured to demonstrate the effects of not initially mixing the opacifying agent particles with the thickening agent. In the comparative examples, which exemplify comparative manufacturing promixing is conducted at a speed of 1,500 revolutions per minute for 20 minutes. The mixture is then transferred to the letdown/blend tank. To the letdown/blend tank is added the second additive composition. Mixing is conducted in the letdown/blend tank at 150 rpm for 15 minutes to manufacture comparative coating composition #1.

TABLE 2

| Composition Name (Reactor) | Materials | Physical Operation | Wt % based on total weight of the coating composition |
|---|---|---|---|
| First Mixture (Grind/Mill Tank) | Titanium dioxide slurry | Add to Grind Mill tank. | 20.00 |
| First Portion of First Additive | Water | Mix for 5 minutes | 12.25 |

TABLE 2-continued

| Composition Name (Reactor) | Materials | Physical Operation | Wt % based on total weight of the coating composition |
|---|---|---|---|
| Composition (Grind/Mill Tank) | Ethylene glycol | at 500 rpm. | 2.00 |
| | Dispersant | | 0.10 |
| | Nonionic surfactant | | 0.50 |
| | Amino alcohol | | 0.05 |
| | Defoamer | | 0.50 |
| Second Portion of First Additive Composition (Grind/Mill Tank) | Nepheline syenite | Mix for 20 minutes at 1500 rpm. | 12.00 |
| | Attapulgite clay | | 0.50 |
| | Calcined diatomaceous earth | | |
| Second Mixture (Letdown/Blend Tank) | | Transfer to the Letdown/Blend tank. | |
| Second Additive Composition (Letdown/Blend Tank) | Water | Mix for 15 minutes at 150 rpm. | 4.00 |
| | Opaque polymer | | 6.00 |
| | AVANSE ® polymer latex binder | | 30.00 |
| | Defoamer | | 0.50 |
| | Coalescent | | 1.00 |
| | Mildewcide | | 0.50 |
| | In-can biocide | | 0.05 |
| | HEUR/HASE thickening agent | | 5.00 |
| Coating Composition | | | 100 |

The coating compositions of the Example 1 and the Comparative Example #1 were then subjected to a cleanliness/grit test and the results were measured on a pass/fail basis. In the cleanliness/grit test, a 3 mil (76.2 micrometer) thick wet drawdown of the respective coating composition was made on a laminated chart (Leneta chart). The coating drawdown was then air dried for 24 hours or force dried in an oven (forced air circulated) at 120° F. for 30 minutes. After the coating drawdown was completely dried, the surface was observed for any grit or agglomerated particles that were distinctly visible on the surface. If grit was present and uniformly distributed throughout the drawdown, then the sample was deemed to have failed. If no grit was present on the surface, then the sample was deemed to have passed the test. Four samples of each composition were tested. The results were averaged and the results reported in the Table 3 below.

TABLE 3

| Sample | Grit (Pass/Fail) | Viscosity (KU) |
|---|---|---|
| Example 1 | No Grit Present - Pass | 95 |
| Comparative Example #1 | Grit Present (Uniformly distributed) - Fail | 85 |

As can be seen, the results demonstrate that coating made in Example #1 has a final appearance that is superior to the coating made in Comparative Example #1.

Example 2

This example was conducted to demonstrate the second method of manufacturing the coating composition. As noted above in the Example 1, the opacifying agent particles are first mixed with the thickening agent. For this example, the first reactor was a letdown/blend tank while the second reactor was a grind/mill tank. The first mixture was manufactured in the letdown/blend tank using a first shear rate. The first portion and the second portion of the first additive mixture were then mixed in the grind/mill tank. The first additive mixture was then transferred to the letdown/blend tank and mixed with the first mixture to form the second mixture. To the second mixture in the letdown/blend tank was then added the second additive composition to form the coating composition. The coating composition for this example along with the various process involved in the manufacturing process is shown in the Table 4.

A titanium dioxide slurry and HEUR/HASE associative thickener were mixed in a letdown/blend (i.e., the first reactor) tank at 100 revolutions per minute for 10 minutes to produce the first mixture. The letdown/blend tank is equipped with a stirring shaft configured with an upper and lower impeller whose dimensions and design are noted in Example 1. The shear rate in the letdown/blend tank was 10 sec$^{-1}$. The viscosity of the first mixture was 90 KU.

In the grind/mill tank (i.e., the second reactor), the first portion of the first additive composition was then subjected to mixing. The first portion comprises water, ethylene glycol, copolymer dispersant, nonionic surfactant, amino alcohol and the defoamer. The first portion of the first additive composition is mixed at 1000 revolutions per minute for 10 minutes. Following this, the second portion of the first additive composition is added to the grind/mill tank reactor. The second portion of the second additive composition comprises an inorganic phosphate surfactant, nepheline syenite, attapulgite clay, and calcined diatomaceous earth. The resulting mixture was mixed at 1500 revolutions per minute for 20 minutes to form the second mixture. The shear rate in the grind/mill tank was 200 sec$^{-1}$.

The first additive composition was then added to the first mixture in the letdown/blend tank to form the second mixture. The mixture in the letdown/blend tank is mixed at 100 revolutions per minute for 5 minutes.

To the second mixture is added the second additive composition in the letdown/blend tank to form the coating composition. The second additive composition comprises water, an opaque polymer, AVANSE® polymer latex binder (commercially available from Rohm and Haas Co.), a coalescent, a mildewcide, an in-can biocide and the second portion of the HEUR/HASE associative thickener. During the addition of the second additive composition, stirring is conducted in the letdown/blend tank at 150 revolutions per minute for 15 minutes to form the coating composition. The composition along with the ingredients is shown in the Table 4. The coating composition has a viscosity of about 95 KU.

TABLE 4

| Composition Name (Reactor) | Materials | Physical Operation | Wt % based on total weight of the coating composition |
|---|---|---|---|
| First Mixture (Letdown/Blend Tank) | Titanium dioxide slurry | Add to Letdown/Blend tank. Mix for 10 minutes at 100 rpm. | 20.00 |
| | HUER/HASE thickening agent | | 1.00 |
| First Portion of First Additive Composition (Grind/Mill Tank) | Water | Mix for 10 minutes at 1000 rpm. | 12.25 |
| | Ethylene glycol | | 2.00 |
| | Dispersant | | 0.10 |
| | Nonionic surfactant | | 0.50 |
| | Amino alcohol | | 0.05 |
| | Defoamer | | 0.50 |
| Second Portion of First Additive Composition (Grind/Mill Tank) | Inorganic surfactant | Mix for 20 minutes at 1500 rpm. | 0.05 |
| | Nepheline syenite | | 12.0 |
| | Attapulgite clay | | 0.50 |
| | Calcined diatomaceous earth | | 5.00 |
| Mixing First Mixture to First Additive Composition (Letdown/Blend Tank) | | Transfer the first additive composition and the first mixture to the Letdown/Blend tank to form the second mixture. | |
| Second Additive Composition (Letdown/Blend Tank) | Water | Mix for 15 minutes at 150 rpm. | 4.00 |
| | Opaque polymer | | 6.00 |
| | AVANSE ® polymer latex binder | | 30.00 |
| | Defoamer | | 0.50 |
| | Coalescent | | 1.00 |
| | Mildewcide | | 0.50 |
| | In-can biocide | | 0.05 |
| | HEUR/HASE thickening agent | | 4.00 |
| Coating Composition | | | 100 |

Comparative Example 2

In the Comparative Example #2 as in the Comparative Example #1, the thickening agent is added to the coating composition in the final steps as a viscosity modifier. Comparative Example #2 was made in the same manner as Comparative Example #1, except that no HEUR/HASE thickening agent or opacifying agent particles (TiO$_2$) slurry is added to the first mixture and no inorganic phosphate surfactant is added to the second portion of the first additive composition. The coating composition is shown in along with the various process involved in the manufacturing process is shown in the Table 5. As can be seen in the Table 5, the first portion of the first additive composition is added to the grind/mill tank and mixed for 5 minutes. The speed of the impeller is 1000 revolutions per minute. To the grind/mill tank is added the second portion of the first additive composition and mixing is conducted for 20 minutes. The speed of the impeller is increased to 1500 revolutions per minute. The first additive composition prepared in the grind/mill tank is then transferred to the letdown/blend tank. To the letdown/blend tank is added the second additive composition along with the titanium dioxide slurry and the HEUR/HASE thickening agent to produce the comparative coating composition #2.

TABLE 5

| Composition Name (Reactor) | Materials | Physical Operation | Wt % based on total weight of the coating composition |
|---|---|---|---|
| First Portion of First Additive Composition (Grind/Mill Tank) | Water | Mix for 10 minutes at 1000 rpm | 12.25 |
| | Ethylene glycol | | 2.00 |
| | Dispersant | | 0.10 |
| | Nonionic surfactant | | 0.50 |
| | Amino alcohol | | 0.05 |
| | Defoamer | | 0.50 |
| Second Portion of First Additive Composition (Grind/Mill Tank) | Nepheline syenite | Mix for 20 minutes at 1500 rpm | 12.0 |
| | Attapulgite clay | | 0.50 |
| | Calcined diatomaceous earth | | |
| Second Mixture (Letdown/Blend Tank) | | Transfer first additive composition from the Grind/Mill Tank to the Letdown/Blend Tank. | |

TABLE 5-continued

| Composition Name (Reactor) | Materials | Physical Operation | Wt % based on total weight of the coating composition |
|---|---|---|---|
| Second Additive Composition (Letdown/Blend Tank) | Water | Mix for 15 minutes at 150 rpm | 4.00 |
| | TiO$_2$ slurry | | 20.00 |
| | Opaque polymer | | 6.00 |
| | AVANSE ® polymer latex binder | | 30.00 |
| | Defoamer | | 0.50 |
| | Coalescent | | 1.00 |
| | Mildewcide | | 0.50 |
| | In-can biocide | | 0.05 |
| | HEUR/HASE thickening agent | | 5.00 |
| Coating Composition | | | 100 |

The coating compositions of the Example 2 and the Comparative Example #2 were then subjected to cleanliness/grit testing as described above. Four samples were tested. The results were averaged and the results reported in the Table 6 below.

TABLE 6

| Sample | Grit (Pass/Fail) | Viscosity (KU) |
|---|---|---|
| Example 2 | No Grit Present - Pass | 95 |
| Comparative Example #2 | Grit Present (Uniformly distributed) - Fail | 85 |

As can be seen the results demonstrate that the coating made in Example #2 has a final appearance that is superior to the coating made in the Comparative Example #2.

As can be seen from the results above, the coating composition where the opacifying agent particles are first mixed with the thickening agent can be manufactured using a lower shear rate of less than of equal to about 2,000 sec$^{-1}$ than that compared with other comparative manufacturing processes where the thickening agent is added during the final states of the manufacturing process. In an exemplary embodiment, the lower shear rate can be less than or equal to about 500 sec$^{-1}$, specifically less than or equal to about 100 sec$^{-1}$, and more specifically less than or equal to about 10 sec$^{-1}$. The initial mixing of the opacifying agent particles with the thickening agent is also advantageous in that crowding is controlled and the formation of grit is minimized.

In comparative manufacturing processes, crowding is avoided by employing high shear rates of greater than or equal to about 1,000 sec-1, specifically greater than or equal to about 5,000 sec$^{-1}$ throughout the manufacturing process. The use of high shear rates requires the use of larger amounts of energy than the disclosed process. In addition, the use of more expensive equipment necessitates the use of greater capital outlays. Since the process can only use a higher shear rate it is not as robust as the disclosed process.

While the invention has been described in detail in connection with a number of embodiments, the invention is not limited to such disclosed embodiments. Rather, the invention can be modified to incorporate any number of variations, alterations, substitutions or equivalent arrangements not heretofore described, but which are commensurate with the scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A method comprising:
    mixing opacifying agent particles with a thickening agent to form a first mixture; the mixing being conducted at a shear rate of about 10 to about 2,000 sec$^{-1}$; the first mixture having a viscosity of greater than or equal to about 70 Krebs units as measured at a temperature of 25° C.; and
    mixing a second additive composition comprising a polymer latex binder with the first mixture to form a coating composition; the polymer latex binder comprising a copolymer that comprises phosphorus-containing repeat units and acrylate repeat units.

2. The method of claim 1, wherein the mixing involves the use of shear forces.

3. The method of claim 1, further comprising mixing a first additive composition with the first mixture to form a second mixture; the first additive composition comprising additives; the additives being an inorganic surfactant, a liquid medium, a dispersant, a nonionic surfactant, a buffering agent, a coalescent, a defoamer, an extender, a clay thickener, or a combination comprising at least one of the foregoing additives.

4. The method of claim 3, wherein the first additive composition is added in a plurality of portions.

5. The method of claim 4, wherein the first additive composition is added in a first portion and a second portion.

6. The method of claim 3, wherein the mixing of the first additive composition with the first mixture to form the second mixture is conducted at a shear rate of about 10 sec$^{-1}$ to about 10,000 sec$^{-1}$.

7. The method of claim 1, wherein the first mixture is mixed in a grind tank, a mill tank, a letdown tank or a blend tank.

8. The method of claim 3, wherein the second mixture is mixed in a grind tank, a mull tank, a letdown tank or a blend tank.

9. The method of claim 3, wherein the second additive composition further comprises a liquid medium, an opaque polymer, a coalescent, a preservative, additional thickening agent, or a combination comprising at least one of the foregoing additives.

10. The method of claim 1, wherein the mixing is conducted in a grind tank or a mill tank comprising an impeller operated at a rotational speed of about 100 to about 2000 revolutions per minute.

11. The method of claim 3, wherein the mixing is conducted in a grind tank or a mill tank comprising an impeller operated at a rotational speed of about 100 to about 2000 revolutions per minute.

12. The method of claim 9, wherein the mixing is conducted in a grind tank or a mill tank comprising an impeller operated at a rotational speed of about 100 to about 2000 revolutions per minute.

13. The method of claim 1, wherein the mixing is conducted in a letdown tank or a blend tank comprising a stirring shaft having a plurality of impellers.

14. The method of claim 1, wherein the mixing is conducted in a letdown tank or a blend tank comprising a stirring shaft having a first, second, and a third impeller; the first impeller having a diameter of about 1 to about 100 inches; the second impeller having a diameter of about 1 to about 200 inches; the third impeller having a diameter of about 1 to about 200 inches; and wherein the impellers are of a curved blade turbine or a pitched blade type; the pitch being about 30 to about 60 degrees.

15. The method of claim 3, wherein the mixing is conducted in a letdown tank or a blend tank comprising a stirring shaft having a plurality of impellers.

16. The method of claim 9, wherein the mixing is conducted in a letdown tank or a blend tank comprising a stirring shaft having a plurality of impellers.

17. The method of claim 1, wherein the polymer latex binder is a dispersion of a copolymer comprising about 0.5 to about 2.0 wt % of phosphorus-containing monomers; greater than or equal to about 20 wt % of ethyl acrylate, methyl acrylate, or combinations of ethyl acrylate and methyl acrylate; and less than or equal to about 79.5 wt % of one or more mono-ethylenically unsaturated monomers, the mono-ethylenically unsaturated monomers excluding the phosphorus-containing monomer, ethyl acrylate and methyl acrylate.

18. The method of claim 1, wherein the thickening agent is a hydrophobically modified thickening agent selected from the group consisting of hydrophobicaUy modified ethylene oxide urethane (HEUR) polymers, hydrophobically modified alkali soluble emulsion (HASE) polymers, hydrophobically modified hydroxyethyl cellulose (HMHEC), hydrophobically modified polyacrylamide, and a combination comprising at least one of the foregoing thickening agents.

19. The method of claim 1, wherein the thickening agent is a hydrophobically modified ethylene oxide urethane (HEUR) polymer, a hydrophobically modified alkali soluble emulsion (HASE) polymer, or a combination comprising at least one of the foregoing thickening agents.

20. A method comprising:
mixing opacifying agent particles with a first portion of a thickening agent to form a first mixture; the mixing of the first mixture being conducted at a first shear rate of about 10 to about 2,000 $sec^{-1}$, the first mixture having a viscosity of greater than or equal to about 70 Krebs units as measured at a temperature of 25° C.;
mixing a first portion of a first additive composition with a second portion of the first additive composition to form the first additive composition; the first portion comprising a dispersant, a nonionic surfactant, a buffering agent, a defoamer and a liquid medium; the second portion comprising an inorganic phosphate surfactant, an extender and a clay thickener;
mixing the first additive composition with the first mixture to form a second mixture; and
mixing a second additive composition with the second mixture to form the coating composition; the second additive composition comprising the liquid medium, an opaque polymer, a polymer latex binder, a defoamer, a coalescent, preservatives, a second portion of the thickening agent; the polymer latex binder comprising a copolymer that comprises phosphorus-containing repeat units and acrylate repeat units.

21. The method of claim 20, wherein the first mixture is mixed in a grind tank, a mill tank, a letdown tank or a blend tank.

22. The method of claim 20, wherein the mixing of the first additive composition with the first mixture to form the second mixture is conducted at a second shear rate of about 1,000 $sec^{-1}$ to about 10,000 $sec^{-1}$.

23. The method of claim 20, wherein the first mixture and the coating composition are mixed in a first reactor.

24. The method of claim 20, wherein the first mixture and the second mixture are mixed in a first reactor.

25. The method of claim 3, wherein the mixing of the opacifying agent particles with the thickening agent to form the first mixture is conducted at a shear rate of about 10 $sec^{-1}$ to about 1,000 $sec^{-1}$, and the mixing of the first additive composition with the first mixture to form the second mixture is conducted at a shear rate of about 100 $sec^{-1}$ to about 1,500 $sec^{-1}$.

26. The method of claim 20, wherein the mixing of the opacifying agent particles with the first portion of the thickening agent to form the first mixture is conducted at a shear rate of about 10 $sec^{-1}$ to about 1,000 $sec^{-1}$, and the mixing of the first additive composition with the first mixture to form the second mixture is conducted at a shear rate of about 100 $sec^{-1}$ to about 1,500 $sec^{-1}$.

27. The method of claim 1, wherein the maximum shear rate of every step is about 10 to less than or equal to about 500 $sec^{-1}$.

28. The method of claim 20, wherein the maximum shear rate of every step is about 10 to less than or equal to about 500 $sec^{-1}$.

29. The method of claim 1, wherein the second additive composition is added to the first mixture.

30. The method of claim 20, wherein the second additive composition is added to the first mixture.

31. The method of claim 20, wherein the polymer latex binder is a dispersion of a copolymer comprising about 0.5 to about 2.0 wt % of phosphorus-containing monomers; greater than or equal to about 20 wt % of ethyl acrylate, methyl acrylate, or combinations of ethyl acrylate and methyl acrylate; and less than or equal to about 79.5 wt % of one or more mono-ethylenically unsaturated monomers, the mono-ethylenically unsaturated monomers excluding the phosphorus-containing monomer, ethyl acrylate and methyl acrylate.

32. The method of claim 20, wherein the thickening agent is a hydrophobically modified thickening agent selected from the group consisting of hydrophobically modified ethylene oxide urethane (HEUR) polymers, hydrophobically modified alkali soluble emulsion (HASE) polymers, hydrophobically modified hydroxyethyl cellulose (HMHEC), hydrophobically modified polyacrylamide, and a combination comprising at least one of the foregoing thickening agents.

33. The method of claim 20, wherein the thickening agent is a hydrophobically modified ethylene oxide urethane (HEUR) polymer, a hydrophobically modified alkali soluble emulsion (HASE) polymer, or a combination comprising at least one of the foregoing thickening agents.

* * * * *